(12) United States Patent
Schmidt et al.

(10) Patent No.: US 9,360,051 B2
(45) Date of Patent: Jun. 7, 2016

(54) SHAFT BEARING WITH A SHAFT SEAL

(71) Applicant: NIDEC GPM GmbH, Auengrund / OT Merbelsrod (DE)

(72) Inventors: Andreas Schmidt, Auengrund / OT Schwarzbach (DE); Frank Blaurock, Nahetal-Waldau / OT Schleusingerneundorf (DE); Stephan Steinke, Ilmenau / OT Manebach (DE); Peter Amm, Nahetal-Waldau (DE)

(73) Assignee: NIDEC GPM GmbH, Auengrund/OT Merbelsrod (DE)

( * ) Notice: Subject to any disclaimer, the term of this patent is extended or adjusted under 35 U.S.C. 154(b) by 0 days.

(21) Appl. No.: 14/768,470

(22) PCT Filed: Mar. 12, 2014

(86) PCT No.: PCT/DE2014/000134
§ 371 (c)(1),
(2) Date: Aug. 18, 2015

(87) PCT Pub. No.: WO2014/161522
PCT Pub. Date: Oct. 9, 2014

(65) Prior Publication Data
US 2016/0003301 A1  Jan. 7, 2016

(30) Foreign Application Priority Data

Apr. 3, 2013  (DE) .......................... 10 2013 005 677

(51) Int. Cl.
*F16C 33/78* (2006.01)
*F16C 19/18* (2006.01)
(Continued)

(52) U.S. Cl.
CPC ............. *F16C 33/7853* (2013.01); *F16C 19/18* (2013.01); *F16C 33/581* (2013.01); *F16J 15/322* (2013.01); *F16J 15/3228* (2013.01)

(58) Field of Classification Search
CPC ............. F16C 33/7859; F16C 33/7866; F16C 33/7879; F16C 33/7896; F16J 15/002; F16J 15/32; F16J 15/3204; F16J 15/3216; F16J 15/322; F16J 15/3228; F16J 15/3232; F04D 29/046
USPC ........................... 384/481, 482, 486; 416/174
See application file for complete search history.

(56) References Cited

U.S. PATENT DOCUMENTS 3,511,512 A * 5/1970 Wheelock ............ F16J 15/3232
                                                        277/564
3,511,513 A   5/1970 Dahlheimer
(Continued)

FOREIGN PATENT DOCUMENTS

DE   2 238 309 A1   2/1973
DE   29 36 312 A1   3/1980
(Continued)

OTHER PUBLICATIONS

International Search Report of PCT/DE2014/000134, mailed Sep. 26, 2014.
(Continued)

*Primary Examiner* — Phillip A Johnson
(74) *Attorney, Agent, or Firm* — Collard & Roe, P.C.

(57) ABSTRACT

A shaft bearing with a shaft seal, in particular for water pumps in motor vehicles, arranges a special radial shaft seal inside the outer bearing ring. The seal is made up of a stable rear wall arranged at a certain distance from the water-side of the shaft seal and fixed in the outer bearing ring, a secondary lip seal adjacent to a water-side of the rear wall, a support body solidly fixed in position in the outer bearing ring and adjacent to the secondary lip seal and a primary lip seal fixed in position adjacent to the support body on the water side, i.e. on the pressure side and opposite to the support body as well as opposite the outer bearing ring. Leakage openings are also arranged in the outer bearing ring, between the water-sided shaft seal of the shaft bearing and the rear wall which is arranged at a distance therefrom.

6 Claims, 2 Drawing Sheets

Figure 1:
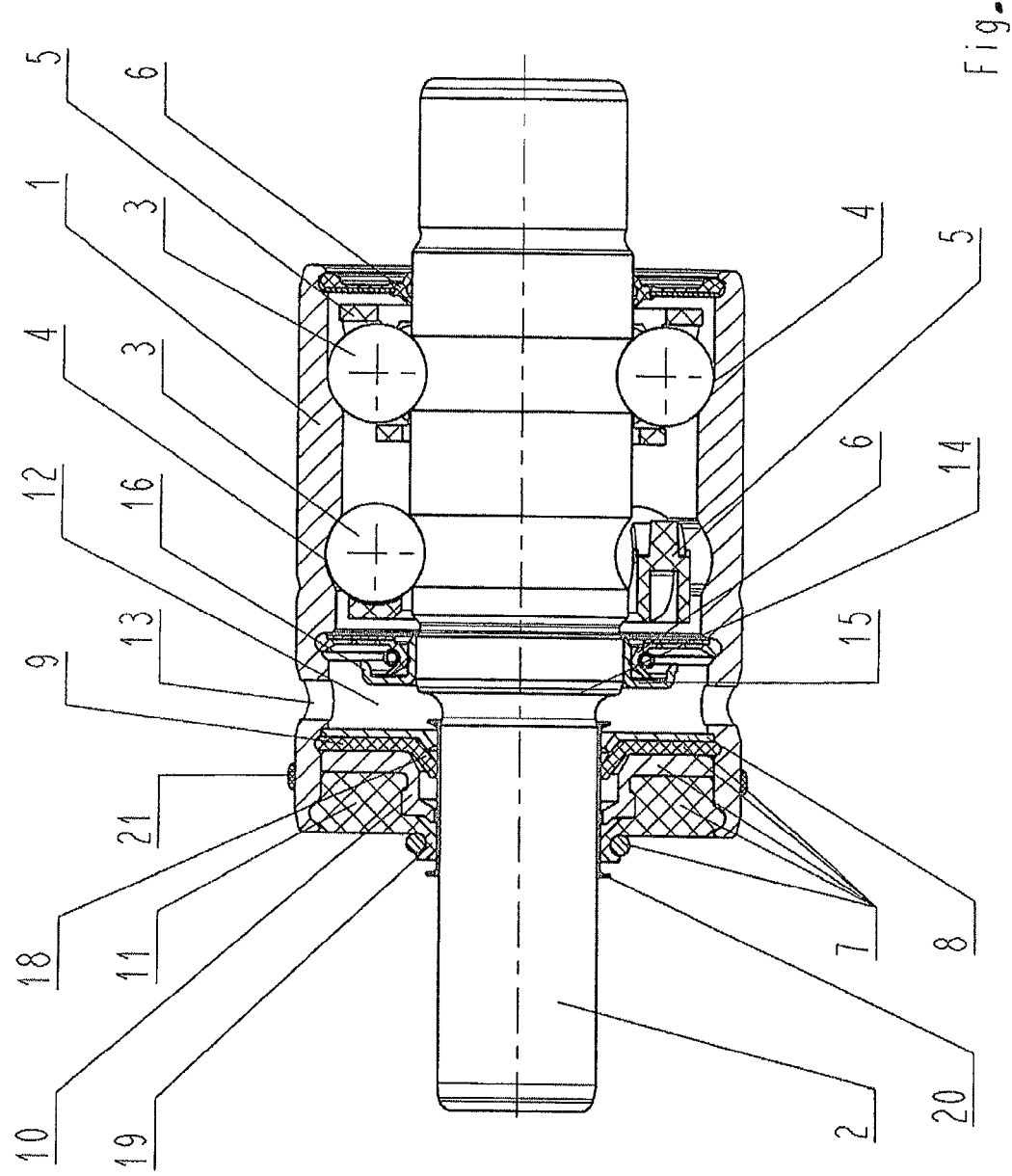

(51) Int. Cl.
    *F16C 33/58*     (2006.01)
    *F16J 15/32*     (2016.01)

(56) References Cited

U.S. PATENT DOCUMENTS

| | | | |
|---|---|---|---|
| 4,329,174 | A | 5/1982 | Ito et al. |
| 4,619,458 | A | 10/1986 | Mitumaru |
| 4,992,023 | A | 2/1991 | Baker et al. |
| 5,538,259 | A | 7/1996 | Uhrner et al. |
| 5,690,433 | A | 11/1997 | Hans et al. |
| 5,704,719 | A * | 1/1998 | Cook ............... F16C 33/7879 277/353 |
| 2003/0001341 | A1 * | 1/2003 | Sakata ............... F16C 19/49 277/423 |
| 2004/0013560 | A1 | 1/2004 | Hrastnik |
| 2005/0146096 | A1 * | 7/2005 | Swisher ............ B28C 5/0818 277/562 |
| 2010/0003163 | A1 | 1/2010 | Kloewer et al. |

FOREIGN PATENT DOCUMENTS

| | | |
|---|---|---|
| DE | 33 24 468 A1 | 1/1985 |
| DE | 44 36 879 B4 | 4/1996 |
| DE | 195 08 404 A1 | 9/1996 |
| DE | 102 24 891 A1 | 12/2003 |
| DE | 10 2006 035 111 A1 | 2/2008 |
| DE | 601 30 871 T2 | 7/2008 |
| EP | 0 194 397 A1 | 9/1986 |
| EP | 0 227 282 A1 | 7/1987 |
| EP | 0 547 652 A1 | 6/1993 |
| EP | 1 867 739 A1 | 12/2007 |
| GB | 1 395 157 A | 5/1975 |
| JP | S58 56193 U | 4/1983 |
| JP | H11 324980 A | 11/1999 |
| WO | 2014/161522 A2 | 10/2014 |

OTHER PUBLICATIONS

Letter to International Office of WIPO dated Oct. 21, 2014 in PCT/DE2014/000134 with English translation of relevant parts.

* cited by examiner

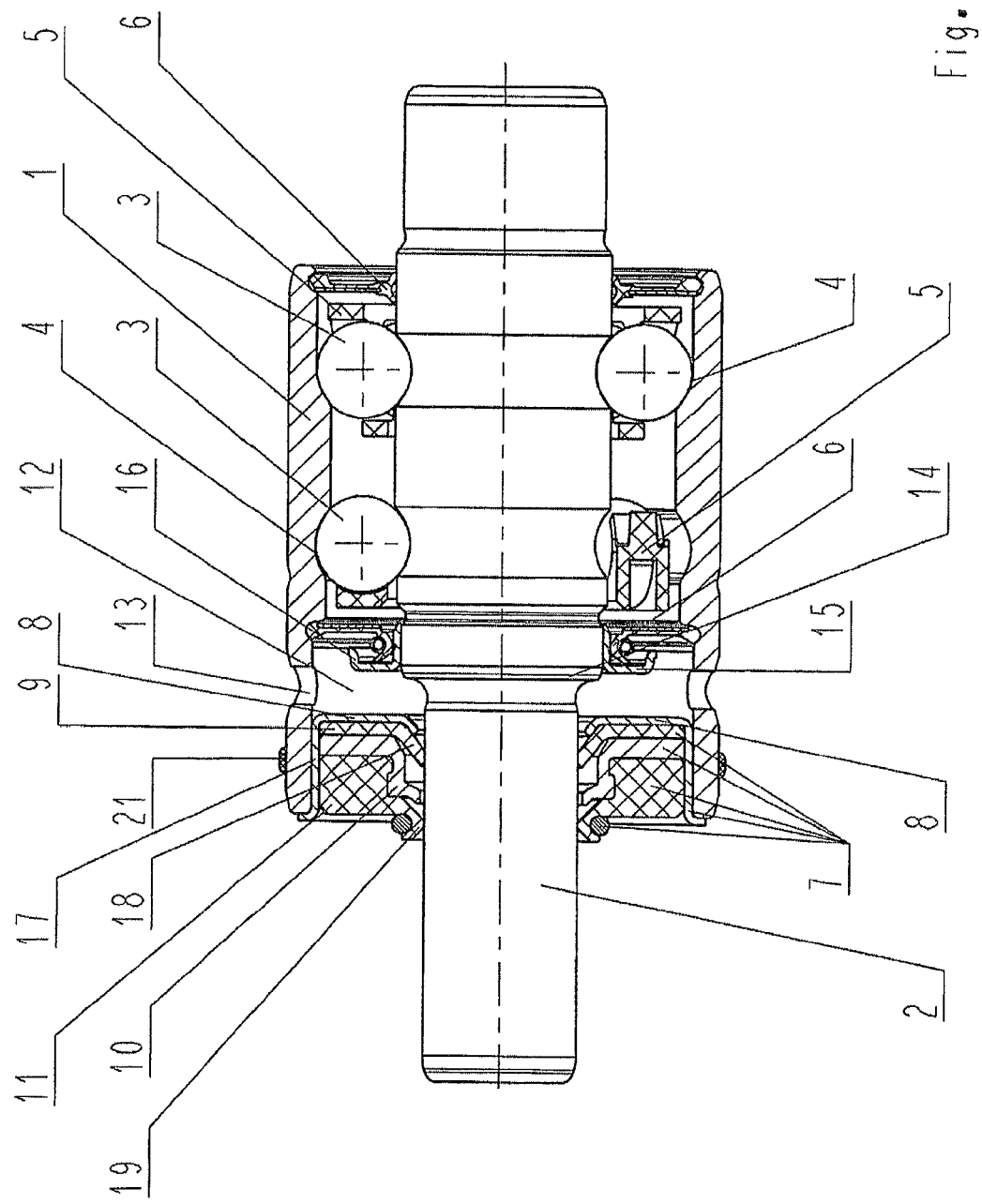

SHAFT BEARING WITH A SHAFT SEAL

CROSS REFERENCE TO RELATED APPLICATIONS

This application is the National Stage of PCT/DE2014/000134 filed on Mar. 12, 2014, which claims priority under 35 U.S.C. §119 of German Application No. 10 2013 005 677.2 filed on Apr. 3, 2013, the disclosure of which is incorporated by reference. The international application under PCT article 21(2) was not published in English.

The invention relates to a shaft bearing with a shaft seal, particularly for water pumps in motor vehicles.

Such shaft bearings are generally disposed in the pump housing of water pumps in motor vehicles, wherein the rolling bodies (for example a two-row ball bearing or roller bearing, or combinations consisting of a ball bearing and a roller bearing) are disposed between a central shaft and a one-piece outer bearing ring, in two rows, in such a manner that the "running grooves" in the shaft are disposed spaced apart from one another in such a manner that their distances correspond to the respective functionally disposed bearing ring grooves in the outer bearing ring part.

For spaced guidance of the rolling elements, these are disposed in cages, as is usual for rolling bearings.

As is generally usual for rolling bearings with grease lubrication, sealing disks are disposed on both sides of the rolling bodies, which disks are supposed to prevent the exit of lubricating grease from the rolling bearing.

Such solutions are previously described in DE 44 36 879 B4, DE 601 30 871 T2, but also in DE 195 08 404 A1.

Not only in the construction according to DE 44 36 879 B4, the construction according to DE 601 30 871 T2, but also in the construction according to DE 195 08 404 A1, a slide ring seal is disposed on the impeller side, i.e. between the shaft bearing and the pump impeller, in the installed state.

In the construction according to DE 44 36 879 B4, this slide ring seal is disposed in the pump housing at a distance from the rolling bearing, in such a manner that passage bores that lead to the outside are disposed in the pump housing, in the region between the slide ring seal and the rolling bearing, which bores guarantee escape to the outside of water or steam that passes through the slide ring seal.

According to the construction according to DE 601 30 871 T2, a seal ring is disposed between the rolling bearing and the slide ring seal, which ring has a core that is attached in a shoulder section at one end of the outer bearing ring of the rolling bearing, wherein this core has such a cross-sectional shape that its center section is curved into an essentially U shape, in such a manner that the core extends along a section of a slinger ring disposed on the shaft next to the slide ring seal and rotating with the shaft, which section is angled away in the direction of the rolling bearing, in the form of a cylindrical crown.

In the case of all these aforementioned constructions, however, a slide ring seal is always disposed on the impeller side, i.e. between the shaft bearing and the pump impeller, so that all the aforementioned constructions are always characterized in that a slide ring is pressed against a counter-ring by means of a pressure spring, and forms a seal with a bellows-like secondary seal. In this connection, the counter-ring is sealed with regard to the housing by means of a further separate seal ring, which is separately installed in the housing next to the outer bearing ring, in a separate press seat.

Such constructions require not only a great number of components that must be individually installed, both during production and during assembly, but also great logistics effort, with simultaneously great production effort, in order to avoid geometric housing deviations (caused, for example, by roughness, out-of-round conditions, etc.), in particular, and thereby to ensure firm seating of the components, on the one hand, and centered running of the water pump shaft relative to the seal (two separate press seats, in each instance), on the other hand.

Because the counter-ring is always sealed separately relative to the basic body, heat dissipation of the friction heat of the slide ring seal to the housing can furthermore be guaranteed only in very poor manner.

The "lifting and tilting" of the slide surfaces that occurs in slide ring seals in connection with "pressure surges" and vibration stresses brings about the result that a reliable seal for liquids can be guaranteed only in limited manner with the aforementioned solutions, also in long-term use.

In this connection, contaminants can furthermore get into the seal gap in the case of slide ring seals; these then greatly impair a reliable, leakage-free seal for liquids.

Further disadvantages result from the very cost-intensive production of a great number of individual parts, as well as the cost-intensive assembly connected with this, wherein furthermore, installation of the shaft bearing from the seal side is not possible in these constructions.

A similar shaft bearing, having a slide ring seal that has a more cost-advantageous structure, in which the counter-ring is directly attached to the outer bearing ring of the shaft bearing, and thereby guarantees more advantageous heat transfer of the friction heat from the slide ring seal to the housing, is presented in DE 2 238 309 A1.

However, because in this solution, as well, the slide ring seal is supposed to take over the sealing function at the water-side end of the rolling bearing, in this solution, too, the danger exists, as was already true before, in connection with the aforementioned intellectual property rights of the prior art, that water or steam that passes through the seal gap will penetrate into the rolling bearing and cause damage there.

To improve the bearing seal, it was proposed in DE 33 24 468 A1 to additionally dispose a lip seal (double-lip ring) ahead of a closed outer sleeve, at the water-side end, ahead of a slide ring seal having a relatively "simple" structure (without anti-twist lock), in a ring groove on the outer edge side, in the outer sleeve of the shaft bearing.

Reliable long-term use cannot be guaranteed with this solution, because no cooling of the sliding surfaces takes place, thereby greatly impairing the reliability of the slide bearing; furthermore, leakage water, once it has penetrated into the shaft bearing, can neither "collect" nor drain out of the shaft bearing again. Also, this solution once again requires great production effort.

In summary, it should be stated that none of the aforementioned solutions meet the demands for modern water pumps, with high running times and extreme cases of use.

The invention is based on the task of creating a shaft bearing with a shaft seal, particularly for water pumps in motor vehicles, which bearing meets the demands for modern water pumps, with high running times and extreme cases of use, reliably guarantees sealing both at high and at low temperatures, over a longer period of operation, clearly reduces heat development, as well as the friction power in the sealing region, significantly reduces, i.e. minimizes the space requirement (installation space of shaft bearing with shaft seal) in the water inflow region (suction space), and, at the same time, clearly reduces the possibility of penetration of contaminants into the seal, with the leakages that result from this, even under extreme conditions of use, at the same time minimizes the production and assembly effort, and furthermore clearly increases the reliability and the useful lifetime of the overall module, even after very long running times, even under extreme conditions of use.

According to the invention, this task is accomplished by means of a shaft bearing with a shaft seal, particularly for water pumps in motor vehicles, in accordance with the characteristics of the independent claim of the invention.

Advantageous embodiments, details, and characteristics of the invention are evident from the dependent claims as well as from the following description of the solution according to the invention, in connection with two representations of constructions of the solution according to the invention.

In this connection, the representations show, in

FIG. 1: one of the possible constructions of the shaft bearing according to the invention, with a shaft seal, in section, in a side view, with components of the special radial shaft seal 7 disposed directly in the outer bearing ring 1, and with a running sleeve 20;

FIG. 2: a further possible construction of the shaft bearing according to the invention, with a shaft seal, in a side view, in section, with a seal housing pot 17 disposed in the outer bearing ring 1, in which pot the components of the special radial shaft seal 7 are disposed (in a construction without a running sleeve).

FIG. 1 shows one of the possible constructions of the shaft bearings according to the invention, with a shaft seal, particularly for water pumps in motor vehicles, in section, in a side view, with components of the special radial shaft seal 7 disposed directly in the outer bearing ring 1, with a running sleeve 20.

In FIG. 2, a further one of the possible embodiments of the shaft bearing according to the invention, with a shaft seal, is shown in section, in a side view. In the solution shown in FIG. 2, a seal housing pot 17 is pressed into the outer bearing ring 1, in which pot the components of a special radial shaft seal 7 are disposed.

The shaft bearing according to the invention, with a shaft seal, particularly for water pumps in motor vehicles, has an outer bearing ring 1 and a shaft 2 centrally disposed within this ring, with rolling bodies 3 disposed between the outer bearing ring 1 and the shaft 2, which bodies circulate between running grooves 4 that are assigned to one another and are disposed in the outer bearing ring 1 and in the shaft 2, wherein the rolling bodies 3 are guided in cages 5, at a distance from one another, with grease lubrication, and, as is usual in the case of grease-lubricated rolling bearings, shaft seals 6 are disposed on both sides of the rolling bodies 3. Aside from the shaft seal 6 adjacent to the rolling bodies 3 on the water side, according to the invention a special radial shaft seal 7 is disposed within the outer bearing ring 1.

It is characteristic for this special radial shaft seal 7, disposed within the outer bearing ring 1, according to the invention, that it consists of a stable rear wall 8, disposed at a distance from the water-side shaft seal 6, fixed in place in the outer bearing ring 1, of a secondary lip seal 9 adjacent to this rear wall 8 on the water side, of a support body 10, firmly fixed in place in the outer bearing ring 1, adjacent to this secondary lip seal 9, and of a primary lip seal 11 disposed adjacent to this support body 10 on the water side, i.e. on the pressure side, fixed in place both with regard to the support body 10 and with regard to the outer bearing ring 1.

The secondary lip seal 9, fixed in place between the rear wall 8 and the support body 10, relative to the outer bearing ring 1, guarantees a great axial sealing effect, in connection with the secondary lip seal 9, which is also fixed in place on the support body 10, relative to the outer bearing ring 1, as well as, simultaneously, a great radial sealing effect, with very precise location positioning, even under very extreme stresses.

It is advantageous, in terms of friction technology, if the free spaces adjacent to the support body 10 are filled with grease in the final installation state.

It is also essential for the invention that leakage openings 13 are disposed in the outer bearing ring 1, between the water-side shaft seal 6 of the rolling bearing and the rear wall 8 of the special radial shaft seal 7 disposed at a distance from the former, i.e. in the leakage space 12, so that coolant that actually does enter into the leakage space 12 at very great extreme stresses can exit or evaporate again, without hindrance.

According to the invention, a shaft step 14 is disposed in the leakage space 12. This allows optimal installation of the modules that axially delimit the leakage space 12, on the one hand.

In this connection, it is also characteristic that the shaft seal 6, firmly fixed in place in the outer bearing ring 1, adjacent to the rolling bodies 3 on the water side, is a radial shaft seal ring, which enters into an active connection with a special slinger collar running sleeve 15 disposed on the shaft 2, with a press fit, in the working region of the related shaft seal 6, on the bearing side, adjacent to the shaft step 14, which sleeve has a slinger collar 16 on the leakage space side.

This slinger collar 16, disposed next to the shaft step 14, brings about the result that any coolant that does enter into the leakage space 12 is slung in the direction of the leakage openings 13 by way of the shaft step 14 and the slinger collar 16, wherein the radial shaft seal that runs on the slinger collar running sleeve 15 and is firmly fixed in place on the outside of the outer bearing ring 1 reliably seals the bearing region with the grease filling off from the leakage space, so that even under very extreme stresses, no coolant can penetrate into the bearing region.

By means of consistently doing without the use of axial slide ring seals, not only are their modules, which are production-intensive and assembly-intensive, eliminated, but specifically, the elimination of the axial slide ring seal leads not only to a saving in construction space, by means of the elimination of the sealing surfaces related with them, which are characteristic for slide ring seals and are pressed axially against one another, but also to a very clear increase in robustness, so that when using the solution according to the invention, lifting off of the sliding surfaces when offset occurs, and vibrations and slanted positions of the sliding surfaces during pressure surges, and the like, can no longer occur.

Even axial tolerances, but also axial vibrations of the bearing system, can be balanced out without problems by means of the use of the solution according to the invention, so that the leakages that result from axial vibrations of the bearing system in the case of axial slide ring seals no longer occur when using the solution according to the invention.

The solution presented here is therefore excellently suited even for very extreme cases of use.

Furthermore, as compared with slide ring seals, only very little wear occurs due to the very narrow sealing edges of the primary and secondary sealing lips, and thereby a clear increase in reliability and useful lifetime of this construction, as compared with the constructions with axial slide seal rings, can be achieved.

However, not only during use but also during assembly, the solution according to the invention allows significantly simpler and furthermore tilt-free assembly as compared with the separate assembly of the shaft bearing and of the axial slide ring seals that is usual in the state of the art.

A further significant advantage of the solution according to the invention also consists in that when using the solution according to the invention, no contamination and/or damage of the seal modules can occur any longer, not only during transport, storage, handling, but also during assembly of the "shaft bearing with shaft seal" according to the invention, of the "compact bearing" according to the invention.

By means of avoiding the use of axial slide ring seals, according to the invention, the friction power in the sealing region is furthermore clearly reduced, and thereby the drive-side power losses of the coolant pump are furthermore lowered, and, at the same time, the heat development at the seal gap is clearly reduced, so that both at high and at low temperatures, optimal sealing, with low friction loss, with a clear increase in the running times during long-term operation, can be guaranteed.

Aside from the advantages of the solution according to the invention as already explained, the use of the solution according to the invention leads to optimization of the installation space, with a clear reduction in the space requirement for the installation of shaft bearings with shaft seals in the suction space of the coolant pump.

During production, the shaft bearing according to the invention, with a shaft seal, the "compact bearing" according to the invention, can furthermore be pre-assembled with the corresponding rolling bearings, in accordance with the predetermined pressure ranges and speeds of rotation, and thereby allows optimal design for the respective case of use, with minimized production and assembly effort.

At the same time, the technological effort in the processing of the housings is reduced, and operational inventory management is simplified.

It is advantageous, particularly for simplification of assembly, if the individual parts of the special radial shaft seal 7 are disposed in a seal housing pot 17 to fix them in place, as described in connection with FIG. 1 and shown in FIG. 2, wherein this pot, together with the complete special radial shaft seal 7, is then pressed, with a press fit, into the outer bearing ring 1 to be sealed, all the way to ahead of the leakage openings 13, on the water side (i.e. on the pump pressure side), and, in this connection, seals off the leakage space 12 on the (pump) pressure side.

The seal housing pot 17, into which the support body 10 is pressed with a press fit, simultaneously forms the rear wall 8 with its bottom part, in the form of a circular ring disk.

It is also a characteristic of the invention that the secondary sealing lips 18 of the secondary lip seal 9, as well as the primary sealing lips 19 of the primary lip seal 11 lie directly against the shaft 2.

Because the secondary sealing lips 18 as well as the primary sealing lips 19 already lie completely against the shaft in the delivered state of the solution according to the invention, it is advantageous that the "interstices" between these can already be provided with a grease filling in the delivered state, which filling improves the sealing and running properties, on the one hand, and, at the same time, minimizes wear.

It is a further characteristic of the invention that the secondary sealing lips 18 of the secondary lip seal 9 as well as the primary sealing lips 19 of the primary lip seal 11 lie against a running sleeve 20 that is "pushed onto" the shaft 2 to be sealed, with a press fit, on the water side/pressure side.

In this design, it is also advantageous if the interstices between the secondary sealing lips 18 and the primary sealing lips 19 are provided with a grease filling in the delivered state, in order to thereby improve the sealing and running properties of the entire shaft bearing according to the invention, with a shaft seal, and, at the same time, to minimize wear.

It is also advantageous if a seal 21 for liquid, which guarantees reliable sealing relative to the pump housing, is disposed on the outer mantle of the outer bearing ring 1 in the region of the special radial shaft seal 7.

A further characteristic of the invention consists in that in the final assembly state, the leakage openings 13 in the bearing housing lie opposite a ring groove into which at least one leakage/steam exit bore opens. As a result, reliable conducting away of even the slightest leakages is guaranteed, so that even after extremely long running times under the most extreme conditions of use, no water or steam can enter into the bearing region of the arrangement according to the invention.

The use of the shaft bearing according to the invention, with a shaft seal, furthermore leads to significant cost savings not only in production but also in assembly.

For example, the leak test of the complete "water pump" product can be eliminated, because when using the "compact bearing" according to the invention, i.e. the shaft bearing according to the invention, with a shaft seal, the "water-tightness" of the "compact bearing" can now be tested in significantly more cost-advantageous manner and furthermore in automatable manner.

At the same time, a great number of assembly problems, such as possible damage to the seam that can occur during separate installation of the seals into the pump housing, for example, are also excluded/eliminated by means of the solution according to the invention.

A further significant advantage of the arrangement according to the invention as compared with a separate seal seat in the housing consists in that the center line of the bore, the accommodation seat of the radial seal, and the center axis of the shaft are identical, so that a center offset or possible slanted running of the individual components that enter into an active connection with one another is avoided by means of the solution according to the invention.

By means of the solution according to the invention, it has become possible to create a shaft bearing with a shaft seal, particularly for water pumps in motor vehicles, in the construction of a "compact bearing" according to the invention, which bearing meets the demands of modern water pumps with high running times and extreme cases of use, and which reliably guarantees sealing both at high and at low temperatures, over a longer period of operation, clearly reduces heat development as well as the friction power in the sealing region, significantly reduces, i.e. minimizes the space requirement (installation space of shaft bearing with shaft seal) in the water inflow region (suction space), and, at the same time, clearly reduces the possibility of penetration of contaminants into the seal, with the leakages that result from this, even under extreme conditions of use, and, at the same time, minimizes the production and assembly effort, and furthermore clearly increases the reliability and the useful lifetime of the overall module, even under extreme conditions of use.

REFERENCE SYMBOL LIST 1 outer bearing ring
2 shaft
3 rolling body
4 running groove
5 cage
6 shaft seal
7 special radial shaft seal
8 rear wall
9 secondary lip seal
10 support body 11 primary lip seal
12 leakage space
13 leakage opening
14 shaft step
15 slinger collar running sleeve
16 slinger collar
17 seal housing pot
18 secondary sealing lip
19 primary sealing lip
20 running sleeve
21 seal for liquids

The invention claimed is:

1. Shaft bearing with a shaft seal, for water pumps, having an outer bearing ring and a shaft centrally disposed in outer bearing ring, with rolling bodies disposed between the outer bearing ring and the shaft, wherein the rolling bodies circulate between running grooves that are aligned with respect to one another and are disposed in the outer bearing ring and in the shaft, wherein the rolling bodies are guided in cages, at a distance from one another, with grease lubrication, and shaft seals are disposed on both sides of the rolling bodies, wherein a first shaft seal of the shaft seals is adjacent to the rolling bodies on a water and pressure side, wherein further shaft seal arrangements are disposed in the water pump housing, wherein the further shaft seal arrangements are not axial slide ring seals, the further shaft seal arrangements are disposed within the outer bearing ring, the further shaft seal arrangements form a radial shaft seal comprising:

a stable rear wall, disposed at a distance from the first shaft seal, and fixed in place in the outer bearing ring, a secondary lip seal adjacent to the stable rear wall on the water and pressure side, a support body firmly fixed in place in the outer bearing ring, adjacent to the secondary lip seal, and a primary lip seal disposed adjacent to the support body on the water and pressure side, and fixed in place both with regard to the support body and with regard to the outer bearing ring, leakage openings are disposed in the outer bearing ring, between the first shaft seal of the rolling bearing and the stable rear wall of the radial shaft seal and in a leakage space, a shaft step is situated in the leakage space, the first shaft seal is firmly fixed in place in the outer bearing ring and is a radial shaft seal ring entering into an active connection with a slinger collar running sleeve, and the slinger collar running sleeve is disposed on the shaft, with a press fit, in the working region of the first shaft seal, on the bearing side, adjacent to the shaft step, the slinger collar running sleeve having a slinger collar on a leakage space side.

2. The shaft bearing with the shaft seal according to claim 1, wherein the individual parts of the radial shaft seal are disposed in a seal housing pot to fix them in place, which pot is pressed into the outer bearing ring to be sealed, with a press fit, all the way to ahead of the leakage openings, on the water and pressure side.

3. The shaft bearing with the shaft seal according to claim 1, wherein the secondary sealing lips of the secondary lip seal as well as the primary sealing lips of the primary lip seal lie directly against the shaft.

4. The shaft bearing with the shaft seal according to claim 1, wherein the secondary sealing lips of the secondary lip seal as well as the primary sealing lips of the primary lip seal lie against a running sleeve that is pushed onto the shaft to be sealed, on the water and pressure side, with a press fit.

5. The shaft bearing with the shaft seal according to claim 1, wherein a seal for liquid is disposed in the region of the radial shaft seal, on the outer mantle of the outer bearing ring.

6. The shaft bearing with the shaft seal according to claim 1, wherein in the final assembly state, a ring groove lies opposite the leakage openings in the bearing housing, and wherein the leakage openings end in the ring groove.

* * * * *